United States Patent [19]

Gramse et al.

[11] Patent Number: 4,543,182
[45] Date of Patent: Sep. 24, 1985

[54] PARTS WASHING AND/OR FLUID RECOVERY APPARATUS

[75] Inventors: Jack A. Gramse, Massillon; Jon C. Pierce, Chardon, both of Ohio

[73] Assignee: Solvent Extractors Inc., Massillon, Ohio

[21] Appl. No.: 481,304

[22] Filed: Apr. 1, 1983

[51] Int. Cl.[4] .......................... B01D 21/10; B08B 3/00
[52] U.S. Cl. ...................................... 210/95; 210/167; 210/196; 210/248; 210/312; 210/539; 134/111
[58] Field of Search ............... 210/248, 250, 299, 312, 210/521, 532.1, 538, 416.1, 416.5, 167, 169, 194, 513, 265, 540, 539, 776, 196, 95; 134/10, 109–112

[56] References Cited

U.S. PATENT DOCUMENTS

| 18,293 | 9/1857 | Naughten | 210/538 |
|---|---|---|---|
| 410,048 | 11/1889 | Brickenstein et al. | 210/532.1 |
| 1,121,270 | 12/1914 | McDermott | 210/533 |
| 1,831,121 | 11/1931 | Kermer | 203/DIG. 22 |
| 2,083,861 | 6/1937 | Padgett | 210/60 |
| 2,303,491 | 12/1942 | Otterson | 210/416.1 |
| 2,352,356 | 6/1944 | Albertson | 210/416.1 |
| 2,675,012 | 4/1954 | Scales | 210/416.1 |
| 2,677,381 | 5/1954 | Fisher | 134/111 |
| 2,747,680 | 5/1956 | Kilpatrick | 210/513 |
| 2,894,631 | 7/1959 | Levit et al. | 134/111 |
| 3,020,918 | 2/1962 | Albertson et al. | 134/111 |
| 3,303,932 | 2/1967 | Hirs et al. | 210/776 |
| 3,416,544 | 12/1968 | Paiva | 134/111 |
| 3,425,791 | 2/1969 | Koberg | 210/513 |
| 3,651,607 | 3/1972 | Lee | 210/248 |
| 3,707,404 | 12/1972 | Carlson et al. | 134/10 |
| 3,786,826 | 1/1974 | Taylor | 210/513 |
| 4,029,115 | 6/1977 | Wheeler | 134/111 |
| 4,056,114 | 11/1977 | Boutillette | 210/167 |
| 4,253,964 | 3/1981 | Pielkenrood | 210/513 |
| 4,308,136 | 12/1981 | Warne, Jr. | 210/265 |
| 4,317,720 | 3/1982 | Hawk | 210/86 |
| 4,422,931 | 12/1983 | Wolde-Michael | 210/532.1 |

FOREIGN PATENT DOCUMENTS 256972  2/1913  Fed. Rep. of Germany ...... 210/513

OTHER PUBLICATIONS

Graymills Catalog HK 10–180.

Primary Examiner—Hiram H. Bernstein
Assistant Examiner—Titus B. Ledbetter, Jr.
Attorney, Agent, or Firm—Maky, Renner, Otto & Boisselle

[57] ABSTRACT

Apparatus for recovery and reuse of parts cleaning fluid or similar fluid such as oil upon separation and removal from water, including a tank for receiving and collecting the water and fluid which floats atop the water. A removable shelf may be slidably mounted in the upper part of the tank for directing the fluid flow to the rear of the tank for channeled passage to a sludge collector. A box-like housing having a water discharge chamber partitioned by a plate-like baffle into water entry and outlet compartments which open to the upper part of the chamber that is vented to atmospheric pressure may be mounted in the lower part of the tank by associated fluid drain fittings. The outlet compartment has a drain whereas the water entry compartment has a relatively small inlet closely adjacent the bottom of the tank so that only water will flow into the water discharge chamber for automatic discharge from the tank upon the level thereof exceeding the height of the baffle. Also contained within the tank is a fluid reservoir which opens to the interior of the tank at a level higher than the height of the baffle for receipt and storage of fluid floating atop the water. A pump may be used to recycle the fluid, such fluid flowing through filters placed in the lower part of the reservoir and hoses terminating at a nozzle located above the tank. Also, a sight glass may be mounted in a side wall of the tank to permit visual observation of the respective fluid and water levels in the tank.

22 Claims, 8 Drawing Figures

PARTS WASHING AND/OR FLUID RECOVERY APPARATUS

This invention relates generally to parts washing and/or fluid recovery apparatus. More particularly, such apparatus is of the type having provision for recovery and/or reuse of a cleaning fluid or other such fluid such as oil upon separation and removal from water.

BACKGROUND

In garages, machine shops, tool shops and the like where the cleaning of greasy, oily and grimy parts is performed, commonly a cleaning solvent is applied to the parts as by dipping or spraying to remove the grease, oil, grime and other similar deposits from the part. Then the part is sprayed or washed with water to remove the solvent and any remaining dirt residue. Although the used solvent and water and the residue might simply be flushed down an open drain, resulting in both loss of the solvent and contamination of the water system, environmental considerations require that the solvent, water and residue be collected in some type of container for proper disposal. Also it would be desirable to separate the solvent from the dirt residue and water for later reuse.

One such type of cleaning fluid recovery apparatus which provides for solvent recovery and automatic discharge of the wash water used in the parts cleaning operation is disclosed in U.S. Pat. No. 4,317,720. The apparatus includes a tank for receiving the wash water and cleaning solvent, the latter of which floats atop the water by reason of it having a specific gravity less than that of the water. Also provided is a screen mounted at the open top of the tank for supporting parts to be cleaned, and a removable shallow tray mounted beneath the screen which serves to collect and retain dirt and sludge removed from the parts being cleaned.

The apparatus disclosed in such patent also includes an inverted, generally U-shaped drain pipe extending upwardly from the bottom wall of the tank. The drain pipe has inlet and outlet ends and an intermediate curved portion. The inlet end is located within and closely adjacent the bottom wall of the tank whereas the outlet end is located beneath such bottom wall. With such an arrangement, water will flow out of the tank through the drain pipe upon the level of the water in the tube reaching the inside radius of the curved portion of the pipe while the cleaning solvent remains in a layer on top of the water exteriorly of the drain pipe. The apparatus also is equipped with a signal tube attached to the tank to indicate when the fluid level has reached a height at which the solvent may begin to overflow the tank, at which time the solvent is drained into a collection receptacle for reuse or refinement.

While the inverted, U-shaped drain pipe provides for automatic removal of water in the manner described, its employment may result in undesirable consequences upon improper use and/or servicing of the apparatus. If for example the drain pipe should become filled with water such as by closing or restricting the outlet end thereof, a siphoning action could occur. This accordingly would undesirably result in the draining of substantially all the water as well as any solvent contained in the tank. Also, the water and solvent spilling over the removable shallow tray may carry with it some sludge and greasy residue which then would collect in the bottom of the tank and/or pass through the drain pipe for undesirable discharge with the water. Over time, sludge and greasy residue also may build up inside the drain pipe and choke off the flow of water, which would adversely affect the water discharge operation and render the apparatus particularly vulnerable to the siphoning action. To prevent this from happening, frequent and time consuming servicing may be necessary, which would involve removal of the solvent and water in the tank to permit removal and/or cleaning of the drain pipe.

SUMMARY OF THE INVENTION

The present invention relates to an improved parts washing and cleaning fluid recovery apparatus and/or oil or other such fluid recovery apparatus. Briefly, according to the subject invention, such apparatus comprises an open top tank for receiving and containing water and an immiscible fluid such as solvent or similar fluid such as oil which has a specific gravity less than that of water whereby the fluid will float as a layer atop the water. Adjacent the open top of the tank may be provided a shelf and an optional screen for supporting parts to be washed while in the lower part of the tank there is provided a water discharge chamber which maintains the water collected in the lower part of the tank below a predetermined level through automatic discharge of the water. Also provided is a fluid reservoir which opens to the interior of the tank at a level higher than such predetermined level for receipt, storage and recovery of such fluid floating atop the water.

According to one aspect of the invention, the water discharge chamber has a bottom wall and side walls for separating the interior of the chamber from fluid collected in the lower part of the tank. An upwardly extending partition or plate-like baffle divides the chamber into water entry and outlet compartments which open to an upper part of the chamber at opposite sides of the partition's top or spill edge located at such predetermined level. The outlet compartment has a bottom drain whereas the inlet compartment has a relatively small inlet closely adjacent the bottom of the tank so that only water will flow into the discharge chamber for automatic discharge from the tank upon the level thereof exceeding the height of the partition. When that occurs, water will spill over the spill edge of the partition for removal from the outlet compartment via the drain. The top of the water discharge chamber may be closed by an easily removable cover located above the combined water and fluid level in the tank. Accordingly, the cover can be removed, even when the tank is full, to permit removal of any sludge or greasy material that may have accumulated within the water discharge chamber. In addition, the upper part of the chamber above the spill edge of the partition is vented to atmospheric pressure to ensure against the remote possible occurrence of a siphoning action within the chamber.

According to another aspect of the invention, the reservoir in the bottom part of the tank is open to the interior of the tank at a top or skimming edge thereof located at a slightly higher elevation than the spill edge of the aforesaid partition. When the cleaning fluid or oil level exceeds the level of such skimming edge, such fluid will flow thereover and into the reservoir where it may be stored for later reuse. When needed, a pump connected to an outlet at the bottom of the reservoir may be operated to pump the fluid through filters in the lower part of the reservoir. Suitable passages, tubing and/or hosing terminating at a nozzle located adjacent the open top of the tank may be provided for recirculating the fluid as desired.

Preferably, the water discharge chamber and fluid reservoir are formed in a common box-like housing which may be conveniently mounted in the lower part of the tank as by means of drain or outlet fittings associated therewith. This facilitates assembly of the apparatus, reduces the number of parts, and allows for easy retrofitting of existing parts washing apparatus employing tanks of the nature described. Also, this ensures proper setting of the fluid discharge height relative to the water discharge height by eliminating the possibility of misadjustment during assembly in the tank.

According to a further aspect of the invention, one or more baffle plates may be placed within the tank between the inlet end of the tank and the water discharge chamber and fluid reservoir contained therein to provide a longer flow path therebetween for any newly introduced fluid and water mixture to provide additional time for the fluid and water to separate before they reach the water discharge chamber and fluid reservoir. Also, a filter may be provided in the water drain line from the water discharge chamber to filter out any minute traces of fluid that might be present in the water discharged from the tank.

According to still another aspect of the invention, the aforesaid shelf is removably mounted in the upper part of the tank with the sides thereof closely adjacent the walls of the tank to define therebeneath a substantially closed space above the fluid and water collected in the lower part of the tank. Such closed space is incapable of containing a sufficient quantity for air for supporting spontaneous combustion of volatile fluids and vapors therefrom, thus rendering the apparatus substantially explosion and fire proof. In addition, the shelf, which may be used as a parts support itself or employed beneath a parts supporting screen, directs the fluid and water to a trough or deflector at the rear of the tank which directs fluid flow to a sludge collector wherein sludge and dirt particles settle out of the fluid or are trapped before passage of the fluid into the main containment portion of the tank.

In addition the foregoing, the invention also has provision for visual observation of the respective fluid and water levels in the tank through a sight glass mounted in a tank side wall and for convenient connection of the air line of a high pressure water spray gun.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figures 1, 3, 5, 6:
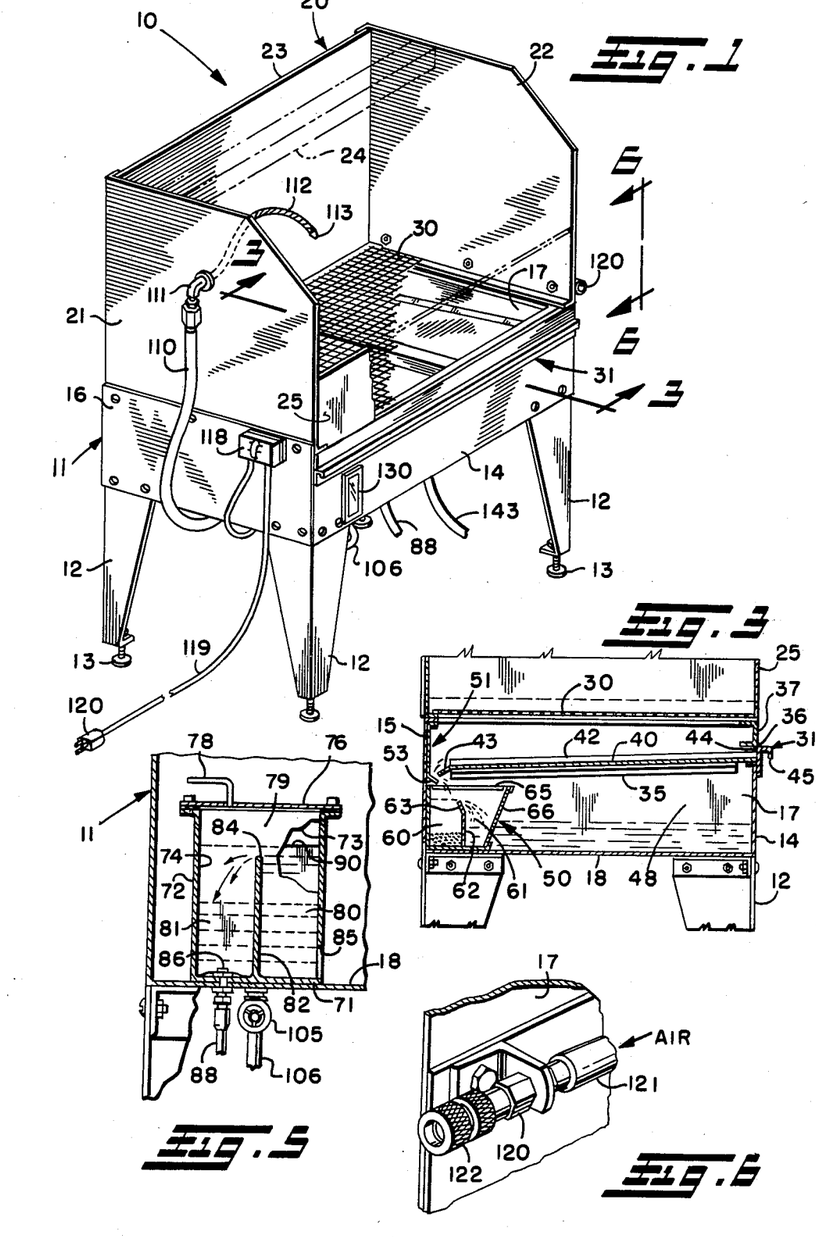
FIG. 1 is a perspective view of a preferred form of parts washing and cleaning fluid recovery apparatus according to the subject invention, portions of which have been partly broken away.
FIG. 3 is a fragmentary vertical section through the apparatus taken substantially along the line 3—3 of FIG. 1.
FIG. 5 is a fragmentary vertical section through the apparatus taken substantially along the line 5—5 of FIG. 4.
FIG. 6 is a fragmentary perspective view of the apparatus as seen from the line 6—6 of FIG. 1.
Figure 2:
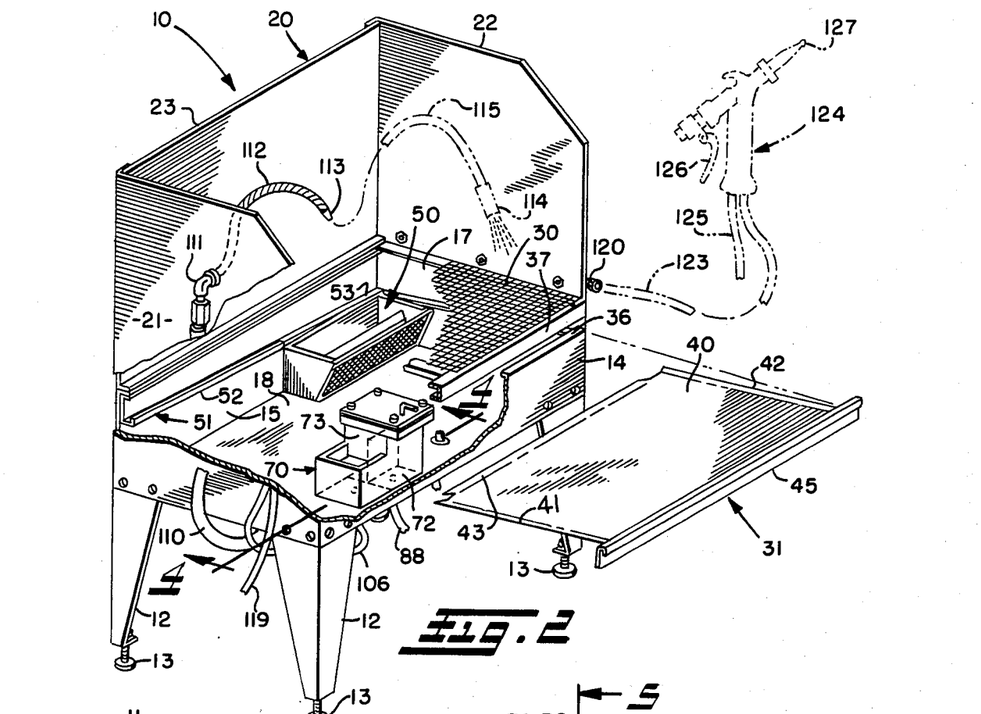
FIG. 2 is a perspective view similar to FIG. 1 but with further parts of the apparatus substantially broken away or exploded to illustrate interior components of the apparatus.

Referring now in detail to the drawings and initially to FIGS. 1 and 2, a parts washing and cleaning fluid recovery apparatus according to the subject invention is designated generally by reference numeral 10. The apparatus 10 includes an open top tank 11 which may be generally rectangular in shape including front and back walls 14 and 15, end walls 16 and 17, and a bottom wall 18 which together form interiorly thereof an enclosure or container for receiving and collecting cleaning fluid and water used to clean and wash parts as described hereafter. Legs 12 each having leveling feet 13 may be provided at the four corners of the tank for supporting the tank at the desired level.

A splashguard designated generally by reference numeral 20 is mounted on the tank 11. The splashguard 20 includes end plates 21 and 22 and a back plate 23 which respectively extend upwardly from the end walls 16 and 17 and back wall 15 of the tank to define interiorly thereof a parts cleaning or work area which may be illuminated by an optional fluorescent light fixture 24 mounted on the splashguard at the top thereof interiorly adjacent the back plate 23. Also, a front plate 25 may extend upwardly from an elongate channel 37 at the front of the tank to further assist in minimizing splash. The front plate 25 is desirably approximately only six to seven inches so as not to interfere with the washing of parts placed in the apparatus as described hereafter.

The bottom of the work area may be formed by a rigid metal screen 30 which may be removably mounted or set on top of the tank 11 interiorly of the splashguard 20 to provide a support surface for parts being cleaned. As shown, the screen may be simply supported at its side and back edges on inturned bottom flanges of the splashguard plates 21-23, respectively. The screen thus can easily be removed for cleaning and to gain access to the interior of the tank. Preferably, the openings in the mesh of the screen are sufficiently small to prevent passage of most parts therethrough but not so small as to preclude the passage of grime and dirt particles being removed from parts during the cleaning and washing operations. The screen should of course be sufficiently stiff to enable it to support the parts being cleaned without escessive sag. If desired, the screen need not be employed. Instead, the parts can be supported on a more rigid, removable shelf 31 mounted in the upper part of the tank a short distance below the open top thereof.

With additional reference to FIG. 3, the removable shelf 31 is preferably slidably supported at each side thereof on a respective angle bracket 35 secured to the respective end wall 16, 17 of the tank 11. Each angle bracket 35 extends substantially between the front and back walls 14 and 15 of the tank and is sloped slightly downwardly a few degrees from front to rear (from right to left in FIG. 3). In the front wall 14 of the tank is a slot 36 through which the shelf can pass for insertion into and removal from the tank. The top of the slot 36 is closed by an elongate channel member 37 which additionally serves as a support for the front edge of the screen 30 when employed. The member 34 is secured to and extends between the end walls 16 and 17 of the tank and forms an upper continuation of the front wall 14.

The removable shelf 31 has a generally rectangular shaped, solid bottom wall 40 which is bent upwardly at its edges to form upturned end walls 41 and 42 and sloped downwardly at its rear edge to form a downturned lip 43. The shelf also has an upwardly extending front wall 44 formed by an inverted J-shape, elongated handle 45 secured to the front edge of the bottom wall 40. The handle 45 facilitates shelf removal and insertion and also serves as an insertion stop for proper positioning of the shelf within the interior of the tank, the handle extending downwardly below the bottom wall 40 for butted engagement against the front wall 14 of the tank as best seen in FIG. 3.

When the shelf 31 is fully inserted in the tank 11 with its bottom wall supported by the angle brackets 35 as seen in FIGS. 1 and 3, the bottom wall 40 thereof slopes slightly downwardly to the rear of the tank so that fluid falling thereon, such as that passing through the screen 30 when employed, will flow to the rear of the tank and down the downturned lip 43 of the shelf for collection in the lower part of the tank. Both the downturned lip 43 and end walls 41 and 42 of the shelf are positioned substantially adjacent respective walls of the tank to define therebeneath a substantially closed space above the cleaning fluid and water collected in the lower part of the tank. Such closed space indicated at 48 is incapable of containing a sufficient quantity of air for supporting spontaneous combustion of volatile cleaning fluid and vapors therefrom, thus serving to render the apparatus substantially explosion and fire proof.

The cleaning fluid and/or wash water falling from the downturned lip 43 of the shelf may pass directly into the lower part of the tank 11 but preferably is first directed to and through a sludge collector 50 mounted in the lower rear part of the tank for example adjacent the end wall 17 and back wall 15. To this end, a longitudinally tapered channel 51 secured to the inside of the tank at the back wall thereof has an inwardly and upwardly extending bottom flange forming an elongate trough 52 which extends beneath the downturned lip 43 of the shelf for catching fluid falling therefrom. The trough 52 slopes slightly downwardly from the end wall 16 to a point above the sludge collector 50 so that essentially all of the fluid falling from the shelf is channeled by the trough to the sludge collector or deflected into the sludge collector by the inwardly extending, downturned lower end portion 53 adjacent one end of channel 51.

As seen in FIGS. 2 and 3, the sludge collector 50 is of a fabricated unitary construction which allows for removal of the sludge collector as a unit from the tank 11 to facilitate cleaning thereof. It is noted, however, that the sludge collector may be fixedly mounted in the tank and/or have walls common with corresponding walls of the tank. In addition, the sludge collector may extend the entire width of the tank, from end wall 16 to the end wall 17, whereupon the trough 52 would no longer be needed.

As best seen in FIG. 3, the interior of the sludge collector 50 is divided into back and front compartments 60 and 61 by an upwardly extending partition or baffle 62. The partition 62 has a slightly rearwardly bent top edge portion 63 which terinates at a horizontal top edge spaced below the open top 65 of the sludge collector. As is also shown, a removable screen or filter 66 forms the front wall of the sludge collector and is forwardly inclined going from bottom to top.

The back compartment 60 of the sludge collector is located to receive fluid being directed thereto by the trough 52 and downturned deflector 53. Accordingly, the fluid and any sludge or dirt particles carried thereby will first flow into and fill the back compartment with the heavier and larger dirt particles settling to and collecting at the bottom of the back compartment. When the back compartment becomes full, fluid will spill or flow over the partition 62 and into the front compartment 61 with the rearwardly bent top portion 63 of the partition serving to deflect fluid entrained sludge and dirt particles back into the back compartment. The fluid received in the front compartment then will flow through the screen or filter 66 and into the main containment portion of the tank 11 as fluid within the front compartment and tank seek the same level. In the manner discussed below, the cleaning fluid and water levels in the tank are controlled by a water discharge chamber and cleaning fluid reservoir indicated at 68 and 69, respectively.

Figure 4:
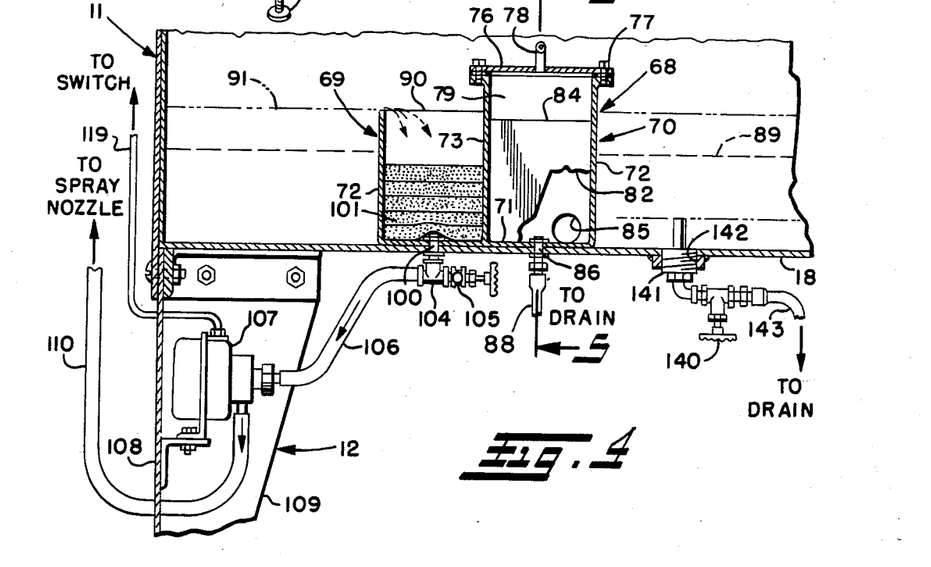
FIG. 4 is a fragmentary vertical section through the apparatus taken substantially along the line 4—4 of FIG. 2.

Referring now in particular to FIGS. 2, 4 and 5, the water discharge chamber 68 and fluid reservoir 69 can be seen to share a common box-like housing 70 which may be fabricated or in the form of a one-piece casting as shown, and which may be conveniently mounted in the lower part of the tank 11 as by means of associated drain or outlet fittings discussed hereinafter. This facilitates assembly of the apparatus and allows for easy retrofitting of existing parts washing apparatus employing tanks of the nature described. Also, this ensures proper setting of the fluid recovery height relative to the water discharge height by eliminating the possibility of misadjustment during assembly of the tank. It is noted, however, that the housing may be otherwise configured and/or fixedly mounted in or on the tank and/or have walls common with corresponding walls of the tank. The chamber 68 and reservoir 69 also may be otherwise formed and located separate and apart from each other while still obtaining the advantages afforded by the subject invention.

The housing 70 shown has a bottom wall 71, external side walls commonly designated by reference numeral 72, and an inner wall 73 separating the water discharge chamber 68 and fluid reservoir 69. The outer side walls 72 of the housing serve to isolate the interiors of the chamber and reservoir from surrounding fluid collected in the lower part of the tank 11. As best seen in FIG. 4, the top of the chamber 68 is at a higher elevation than that of the reservoir 69 and is desirably closed by a cover plate 76 which is removably secured to the housing 70 as by fasteners 77. Attached to the cover plate 76 is a vent tube 78 which extends upwardly and laterally at an elevation above the level of fluid collected in the lower part of the tank so that the upper part 79 of the chamber 68 is always maintained at atmospheric pressure.

With particular reference to FIGS. 4 and 5, the water discharge chamber 68 is divided into water entry and outlet compartments 80 and 81 by a partition or plate-like baffle 82 which extends upwardly from the bottom wall 71 and between the inner wall 73 and opposite outer wall 72 of the housing 70. The compartments open to the vented upper part 79 of the chamber 68 at opposite sides of the horizontal top or spill edge 84 of the partition 82. The water entry compartment is arranged to receive water collected in the lower part of the tank 11 through a relatively small inlet opening 85 in the rear side wall of the housing which is located closely adjacent the bottom of the housing and tank a substantial distance below the spill edge 84 of the partition 82. Also provided is a drain or outlet fitting 86 which opens to the outlet compartment 81 at a level below that of the top spill edge 84 and preferably to the bottom of such outlet compartment 81. As shown, the outlet fitting 86 is secured to and extends through the housing bottom wall 71 and tank bottom wall 18 and thus additionally serves to secure the housing to the bottom wall of the tank. Connected to the lower end of the outlet fitting 86 is a drain tube 88 which may lead to a suitable container or directly to a nearby water system drain for disposal of water being discharged from the tank as described hereafter.

Initially, before the tank is put into use, the tank should be partially filled with water to a level sufficiently above the inlet opening 85 to prevent any fluid from entering the water discharge chamber 68. As water and fluid collect in the lower part of the tank 11, the fluid, having a specific gravity less than water, will float on top of the water and additional water will flow through the inlet opening 85 and into the entry compartment 80 until the pressure head developed in such entry compartment equals the cumulative pressure head of the water and fluid collected in the lower part of the tank exteriorly of the housing 70. As additional fluid and/or water is introduced into the tank, the water in the entry compartment will rise accordingly until it reaches the height of the partition 82 whereupon further addition of fluid and/or water will cause water to spill over the spill edge 84 and into the outlet compartment 81. Water in the outlet compartment is then discharged through the drain 86 and tubing 88 to a suitable container or system drain for disposal.

Through automatic discharge of the water in this manner, the water discharge chamber 68 maintains the water below a maximum predetermined level in the tank, such maximum level coinciding with the height of the spill edge 84 of the partition 82. Normally, the water level exteriorly of the housing 70, indicated at 89 in FIG. 4, will be below the height of the spill edge 84 of the partition 82 when the ank contains both water and fluid whereas the overall height of the wateer and fluid floating on top of the water may rise above the height of the spill edge 84 by reason of the fluid having a lower specific gravity than that of the water. It also is noted that the water discharge chamber 68 can be varied in size for different tank sizes. In addition, the inlet opening 85 can be easily and correspondingly sized for different sizes of tanks. Where the housing 70 is a casting, for example, the inlet opening 85 may be made of any desired size by a subsequent drilling operation.

Preferably, such inlet opening 85 has a relatively small cross-sectional flow area in relation to the tank size and particularly the horizontal cross-sectional area of the entry compartment to reduce vertical oscillation of water in the entry compartment 80 due to any wave action outside of the housing 70, but is sufficiently large in size to allow water to flow into the entry compartment at substantially the same rate as fluid and/or water might desirably be introduced into the tank.

Still referring to FIGS. 4 and 5, the reservoir 69 opens upwardly to the interior of the tank 11 at the top edges of the surrouding outer housing side walls 72 which provide a horizontal top or fluid skimming edge indicated at 90. As shown, the skimming edge 90 is located at a slightly higher elevation than the spill edge 84 of the partition 82 in the water discharge chamber 68 and thus above the highest attainable level of water in the tank. Accordingly, no water can overflow the skimming edge 90 into the reservoir 69. However, as indicated above and as seen at 91 in FIG. 4, the fluid floating atop the water can reach a level above the height at the top spill edge 84 and upon reaching the level of the skimming edge 90 will overflow into the reservoir 69.

The cleaning fluid reservoir 69 can be varied in size as desired and may be formed separate and apart from the water discharge chamber 68 if desired. For example, the reservoir may extend the entire width of the tank 11 and may have one or more walls common with corresponding walls of the tank to reduce the number of required parts and assembly operations.

For recirculation of the fluid received by and stored in the reservoir 69, a drain or outlet fitting 100 opens to the bottom of the reservoir. The fluid outlet fitting 100 shown is secured to and extends through the housing bottom wall 71 and tank bottom wall 18 and thus serves, along with the water outlet fitting 87, to secure the housing 70 to the bottom wall of the tank 11. As seen in FIG. 4, a number of filters 101 may be stacked in and fill the lower part of the reservoir above the outlet fitting 100 for filtering the fluid as it is withdrawn through the outlet fitting. As will be appreciated, the filters can be easily inserted into and removed from the reservoir through the large open top thereof for replacement or cleaning.

The lower end of the fluid outlet fitting 100 is shown connected to the inlet end of a tee indicated at 104. Connected to one outlet stem of the tee 104 is a fluid drain valve 105 which normally is closed but which may be opened to drain fluid from the reservoir 69 and into a suitable container located beneath the tank 11. The other outlet stem of the tee 104 is connected by a tube 106 to the inlet of a pump 107 mounted to the inside of a nearby leg 12. As shown, the leg 12 consists of two right angle gussets 108 and 109 which serve to conceal and protect the pump.

The outlet of the pump 107 may be connected by a tube 110 to one end of an elbow 111 which is secured to and extends through one end plate 21 of the splashguard 20. Secured to the other end of the elbow interiorly of the splashguard is a flexible metal hose 112 which has a nozzle 113 secured at its outlet end. Optionally, a fountain brush, shown in phantom lines at 114, may be connected by flexible hose 115 to the flexible metal hose 112.

For controlling operation of the pump 107, there is provided a switch 118 which may be conveniently mounted to the end wall 16 of the tank 11 as shown in FIG. 1. The switch 118 is connected by a cord 119 running from the pump to a plug 120 which may be plugged into an electrical service outlet. Of course other means may be provided to effect controlled energization of the pump.

Referring now to FIGS. 2 and 6, the apparatus 10 further can be seen to include an air outlet fitting 120 secured to the outside of an end wall 17 of the tank 11. The fitting 120 is connectable by suitable tubing 121 to a source of pressurized air and by a quick disconnect 122 to the air inlet hose 123 of a high pressure air and/or water spray gun seen in phantom lines at 124 in FIG. 2. The spray gun 124 shown has a water inlet hose 125, which may be connected to a suitable water supply, and a pistol-grip trigger 126. The spray gun, upon actuation of the trigger 126, supplies a high pressure spray or stream of water and/or air from the gun's nozzle 127.

Operation

To ready the aforedescribed apparatus 10 for operation, the tank 11 is first preferably leveled by adjusting the leveling feet 13 as needed, and a sufficient quantity of water is introduced into the tank to bring the level thereof substantially above the top of the inlet opening 85 of the water discharge chamber 68. Then a sufficient quantity of fluid such as solvent may be introduced into the tank to fill the fluid reservoir 69 and bring the overall fluid level within the tank to approximately the height of the top skimming edge 90 of the reservoir. The respective levels of the fluid and water within the tank can be readily ascertained by viewing through a sight glass 130 mounted for example in the front wall 14 of the tank as seen in FIG. 1.

In operation, the part to be cleaned may be held above the tank 11 or set on the screen 30 as desired. As previously indicated, the screen 30 need not be employed whereupon the part may be held above or set upon the removable shelf 31. The pump 107 then may be turned on and the fluid outlet nozzle 113 adjusted to direct a spray or stream of cleaning fluid onto the part being cleaned as desired. When sufficiently cleaned, the pump 107 may be turned off and the spray gun 124 used to rinse and/or blow any solvent and residue remaining on the part.

The solvent, water, and at least part of the sludge and other residue falling onto the shelf 31 will flow into the trough 52 at the rear of the tank 11 and to the sludge collector 50 wherein larger dirt particles settle out and smaller particles are trapped by the filter 66. From the sludge collector, the now relatively clean fluid and water will flow into and collect in the bottom part of the tank with the fluid rising to the top of the water by reason of its lower specific gravity.

During the cleaning and washing operation, the recirculated cleaning fluid will return to the tank 11 and flow into the reservoir 69 as long as the level of the cleaning fluid floating atop the water is above the height of the skimming edge 90. Also, water will flow into the entry compartment 80 of the water discharge chamber 68 as additional quantities of water are introduced into the tank. When the water in the entry compartment 80 reaches the height of the partition 82, the water will spill over the spill edge 84 and into the outlet compartment 81 for discharge through the drain 86. This automatic discharge of the water ensures that the water level within the tank will never exceed the height of the skimming edge 90 so that water can never flow into the fluid reservoir 69.

Also during operation, additional quantities of fluid may be introduced into the tank 11 such as when the parts are first rinsed in a solvent bath that later is dumped into the tank. Moreover, the parts may contain or carry oil, or other lighter than water fluids miscible with the cleaning fluid which ultimately will mix with the cleaning fluid and float atop the water. As this occurs, such additional solvent, oil or other fluids will cause the water level to lower within the tank through displacement and discharge of water through the water discharge chamber 68. Therefore the water level of the tank should be monitored periodically as by viewing through the sight glass 130 to make sure that the water level never drops below the top of the inlet opening 85 of the water discharge chamber 68. Should that happen, some cleaning fluid or oil might be discharged along with the water through the drain 86, which would be undesirable. Accordingly, should the water level become too low, additional water should then be introduced into the tank 11 always to maintain the water level above the inlet opening 85.

The combined height of fluid and water in the tank 11 also should be monitored to ensure that it remains below the shelf 31. When the tank becomes too full of cleaning fluid, oil and other water immiscible fluids, the reservoir drain valve 105 may be opened to drain a quantity of such fluids from the tank independently of the pump in order to lower the overall fluid and water height.

In certain instances it has been found necessary to provide a longer flow path in the tank for any newly introduced fluid and water mixture to provide more time for the fluid and water to separate before they reach the water discharge chamber and fluid reservoir. One way of accomplishing this is to place one or more baffle plates in the tank between the inlet end of the tank and the discharge chamber and fluid reservoir.

Figure 7:
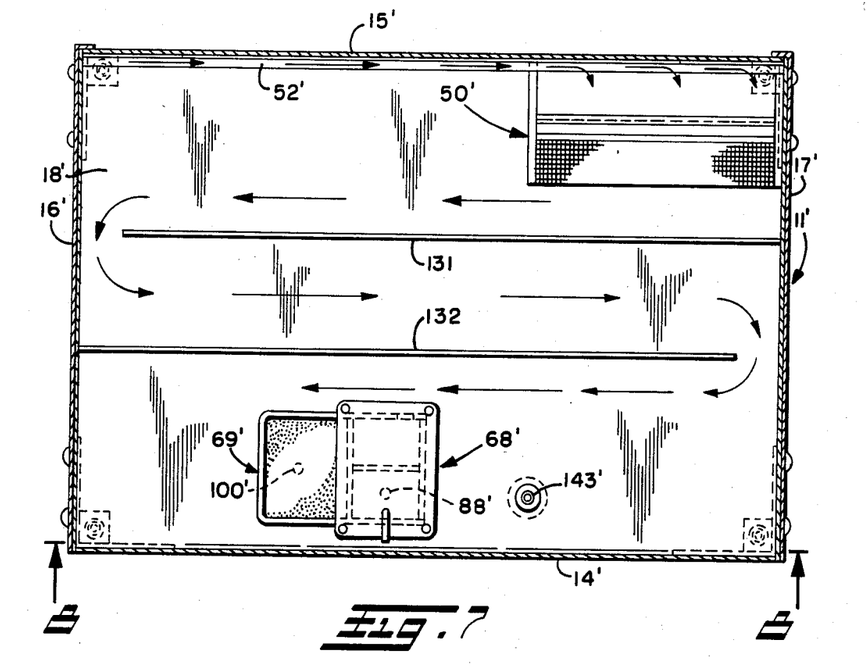
FIG. 7 is a horizontal section through a modified form of tank for use in the apparatus of the present invention having a pair of baffle plates therein for increasing the length of the flow path for any newly introduced fluid and water mixture to provide additional time for the fluid and water to separate before they reach the water discharge chamber and fluid reservoir.
Figure 8:
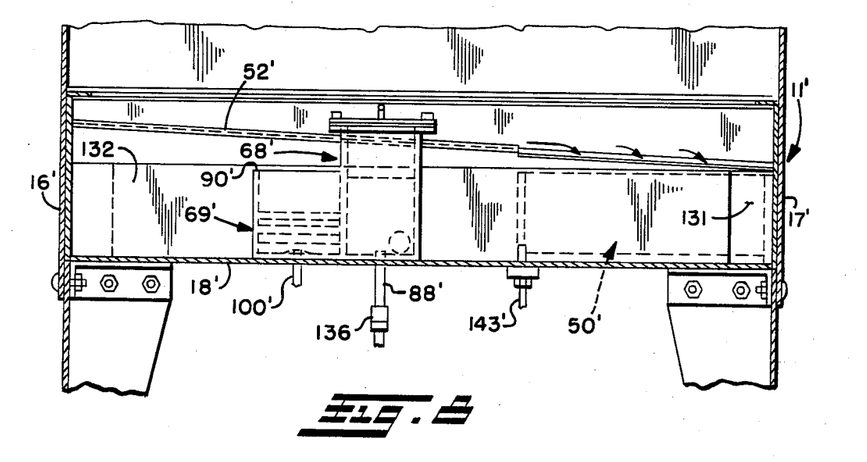
FIG. 8 is a fragmentary vertical section through the tank of FIG. 7 taken on the plane of the line 8—8 thereof.

A preferred form of such a baffle arrangement is shown in FIGS. 7 and 8, wherein two baffle plates 131, 132 are provided within the tank 11'. Both such baffle plates are interposed between the sludge collector 50' and water discharge chamber 68' and fluid reservoir 69' in spaced relation therefrom and from each other. Also, such baffle plates are desirably parallel to each other and to the front and back walls 14', 15' of the tank. The baffle plate 131 extends along the bottom wall 18' of the tank from the end wall 17' closest to the sludge collector and terminates short of the other end wall 16'. The other baffle 132 also extends along the bottom wall, but from the other end wall 16' toward the end wall 17' and terminate short of the end wall 17'. Moreover, both baffle plates 131, 132 desirably have a vertical height somewhat greater than the top edge 90' of the fluid reservoir 69' as shown in FIG. 8 to ensure that any newly introduced fluid and water within the tank will follow the longer flow path defined by the baffle plates and indicated by the arrows in FIG. 7 to provide additional time for the fluid and water to separate before reaching the water discharge chamber and fluid reservoir.

In addition to or in lieu of the baffle plates 131, 132, a filter 136 may be provided in the water discharge line 88' from the water discharge chamber 68' to filter out any minute traces of fluid that might be present in the water discharged from the tank.

Otherwise, the tank shown in FIGS. 7 and 8 is substantially the same as that shown in the previous figures, and accordingly the same reference numerals followed by a prime symbol are used to designate the like parts.

When the cleaning fluid or solvent has become sufficiently contaminated with oil and/or other fluids or material such that it no longer will effectively clean parts, the reservoir drain valve 105 may be opened to drain the fluid reservoir 69 and a tank 11 of substantially all of the contaminated fluid. While this is being done, water may be added to the tank for more complete discharge of the contaminated fluid floating thereon. Also, the fluid filters 101 stacked in the bottom part of the reservoir 69 may be removed for cleaning or replacement, access being obtained thereto through the open top of the reservoir upon removal of the shelf 31 and screen 30 (when employed). Thereafter, the drain valve 105 may be closed and a sufficient quantity of fresh fluid introduced into the tank 11 to fill the reservoir and bring the fluid level back to desired height.

Although relatively infrequently, it may be necessary to clean the water discharge chamber 68 of any sludge or grime that may accumulate therein. This may be done by first removing the shelf 31 and then the cover plate 76 to gain access to such chamber and the compartments 80 and 81 thereof. As will be appreciated, the tank 11 need not be empty in order to clean the water discharge chamber.

To effect a complete cleaning of the tank 11, as when a substantial quantity of sludge or other residue has built up on the bottom wall of the tank, the tank first may be drained of substantially all of the cleaning fluid and any oil or other water immiscible fluids in the manner previously described. Then the water may be drained from the tank by opening a tank drain valve 140 connected to a main drain or outlet fitting 141 screwed into a threaded hole 142 in the bottom wall 18 of the tank. The inlet end of such drain fitting 141 desirably extends a short distance above the bottom wall 18 of the tank so that the accumulated sludge or residue is not carried through the drain by the water. As a result, the water being drained via a tube 143 connected to the valve 140 will be substantially free of sludge and residue. After substantially all of the water has been drained as indicated, the drain fitting 141 may then be removed to complete the cleaning operation. The threaded hole 142 opens flush to the top surface of the tank bottom wall 18 to facilitate discharge of the remaining water, sludge and other residue therethrough and into a container placed beneath the tank. Thereafter, the fitting 141 can be reinstalled and the apparatus readied for further operation as aforesaid.

Although the invention has been shown and described with respect to a preferred embodiment and operation, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. A fluid recovery and water discharge apparatus comprising an open top tank for receiving and collecting water and an immiscible fluid which has a specific gravity less than that of water whereby such fluid will float as a layer atop the water; water depth control means for maintaining the water collected in the bottom part of said tank below a predetermined level, said water depth control means including a chamber located in the lower part of said tank, said chamber having a bottom wall and side walls for separating the interior of said chamber from fluid and water collected in the lower part of said tank, a baffle between opposite side walls of said chamber and extending upwardly in said chamber to divide said chamber into a water inlet compartment and a water outlet compartment which open to an upper part of said chamber at opposite sides of a top spill edge of said baffle located at the predetermined level which is below the height of said chamber side walls, an inlet means to said water inlet compartment positioned below the predetermined level to allow water collected in the bottom part of said tank to pass into said water inlet compartment, and water drain means opening to said water outlet compartment below the predetermined level, whereby when the water in said water inlet compartment exceeds the predetermined level, water will spill over said top spill edge of said baffle for removal from said water outlet compartment via said water drain means; and fluid recovery means located in the lower part of said tank and opening to the interior of said tank at a top skimming edge located at an elevation slightly higher than said top spill edge of said baffle whereby such fluid floating atop the water will spill over said top skimming edge into said fluid recovery means, said chamber side walls extending above the elevation of said top skimming edge, and fluid outlet means opening to said fluid recovery means and leading from said fluid recovery means to the exterior of said tank, said fluid outlet means and water drain means being operable independently of one another to provide for simultaneous fluid skimming and water level control.

2. The apparatus of claim 1 wherein the elevation of said top skimming edge is less than twice the elevation of said top spill edge.

3. The apparatus of claim 1 wherein said inlet means comprises an opening in one of said chamber side walls located closely adjacent the bottom of said tank, said opening having a relatively small cross-sectional flow area in relation to the horizontal cross-sectional area of said water inlet compartment.

4. The apparatus of claim 1 wherein said chamber is closed at its top by a removable cover which is located above the height of said top skimming edge, said cover being removable to permit cleaning of the interior of said chamber, and vent means for maintaining the upper part of said chamber at atmospheric pressure, said vent means including a vent tube open at one end to the upper part of said chamber and at its other end to the upper part of said tank above the water and fluid level in said tank.

5. The apparatus of claim 1 further comprising means for commonly leveling said tank, top spill edge and top skimming edge.

6. The apparatus of claim 1 further comprising sight glass means in a side wall of said tank for permitting visual observation of the respective fluid and water levels in said tank exteriorly of said chamber and reservoir.

7. The apparatus of claim 1 further comprising auxiliary drain fitting means removably mounted in said tank at the bottom thereof, said drain fitting means extending upwardly through the bottom of said tank exteriorly of both said chamber snd said reservoir and having an inlet opening spaced above the bottom of said tank for draining of said tank thereabove, said drain fitting means being removable from said tank to provide a larger opening flush with the bottom of said tank for further draining of said tank.

8. The apparatus of claim 1 further comprising pressurized air fitting means mounted on the exterior of said tank, said air fitting means having one end connectable to a source of pressurized air and the other end connectable to the air line of a water spray gun.

9. The apparatus of claim 1, wherein said baffle is a plate-like baffle extending between opposite side walls of said chamber and upwardly from the bottom wall of said chamber.

10. The apparatus of claim 1, further comprising vent means for maintaining the upper part of said chamber at atmospheric pressure, said vent means opening to the atmosphere at a level above the levels of the top spill edge and top skimming edge.

11. The apparatus of claim 1, wherein said fluid recovery means includes a reservoir for the fluid, said reservoir having a substantially greater horizontal cross-sectional area than the cross-sectional flow area of said fluid outlet means, and means for recycling such fluid entering said fluid outlet means from said reservoir to a nozzle located above said tank.

12. The apparatus of claim 11 wherein said reservoir has an open top for insertion and removal of a filtering means said filtering means, being operative within said reservoir to filter such fluid being withdrawn from said reservoir by said means for recycling, said open top of said reservoir being at an elevation which is lower than the top of said chamber.

13. The apparatus of claim 11 wherein said means for recycling includes a pump mounted exteriorly of said tank.

14. The apparatus of claim 13 further comprising a valved fluid drain means connected to said fluid outlet means exteriorly of said tank for withdrawing the fluid from said reservoir independently of said pump.

15. The apparatus of claim 1 further comprising an imperforate shelf removably mounted in the upper part of said tank, said shelf having upturned sides and front and a downturned rear lip, said shelf sloping downwardly from front to rear whereby any fluid and water that is poured onto said shelf will flow into said tank over said downturned lip, said upturned sides and downturned lip being disposed closely adjacent the walls of said tank to define therebeneath a substantially closed space above such fluid and water collected in the bottom part of said tank, said space having a volume incapable of containing a sufficient quantity of air for supporting spontaneous combustion of such fluid and vapors contained therein thereby to render the apparatus substantially explosion and fire proof.

16. The apparatus of claim 15 further comprising sludge collector means in the lower part of said tank adjacent the back wall of said tank in one corner thereof, and means for directing fluid and water flowing into said tank over said downturned lip on said shelf to said sludge collector means.

17. The apparatus of claim 16 further comprising baffle means, within said tank extending between said sludge collector means, and said fluid recovery means and chamber, for increasing the length of time that it takes for any water and fluid that is introduced into said tank by passing over said downturned lip on said shelf to reach said fluid recovery means and chamber thus providing additional time for such fluid and water to separate before such fluid enters said fluid recovery means and such water enters said chamber.

18. The apparatus of claim 17 wherein said baffle means comprises two baffle plates extending from opposite sides of said tank between said sludge collector, and said fluid recovery means and chamber, said baffle plates extending from opposite sides of said tank in spaced relation from each other, said baffle plates terminating short of the sides of said tank opposite the side from which said baffle plates extend.

19. A cleaning fluid recovery and water discharge device for a parts washing apparatus including an open top tank for receiving and collecting water and an immiscible cleaning fluid which has a specific gravity less than that of water whereby the fluid will float as a layer atop the water, said device comprising a housing adapted to be mounted in the lower part of the tank, said housing having a bottom wall and side walls for separating the interior thereof from such cleaning fluid and wash water collected in the lower part of the tank, an inner wall extending upwardly from said bottom wall and between said side walls dividing the interior of said housing to form a first chamber and a second chamber which are completely isolated from each other, a baffle extending upwardly from said bottom wall and between said side walls within said first chamber partitioning said first chamber into a first compartment and a second compartment which open to an upper part of said first chamber on opposite sides of said baffle, water inlet means below the height of said baffle for admitting water into said first comparment from outside said housing, water drain means opening to said second compartment below the height of said baffle for discharging water from said second compartment, cleaning fluid inlet means located above the height of said baffle for admitting into said second chamber cleaning fluid floating atop the water in the tank, said inner wall and side walls extending above the height of said cleaning fluid inlet means, and cleaning fluid outlet means opening to the bottom of said second chamber for removal of cleaning fluid therefrom, said cleaning fluid outlet means and water drain means being operable independently of one another to provide for simultaneous discharge of water and removal of cleaning fluid from said first and second chambers, respectively.

20. The device of claim 19 wherein said water drain means and cleaning fluid outlet means include respective fitting means for securing said housing to the bottom wall of the tank.

21. The device of claim 19 wherein said first chamber is closed at the top which is located at an elevation above the elevation of said cleaning fluid inlet means, and means are provided for maintaining the upper part of said first chamber above said baffle at atmospheric pressure.

22. The device of claim 19 wherein said second chamber forms a reservoir having an open top defining said cleaning fluid inlet means, said open top being located at an elevation slightly higher than the height of said baffle and lower than the height of said inner wall and side walls.

* * * * *